US010962472B2

United States Patent
Cole et al.

(10) Patent No.: US 10,962,472 B2
(45) Date of Patent: Mar. 30, 2021

(54) IN VITRO DIFFUSE REFLECTANCE SPECTROSCOPY

(71) Applicant: SOLAR LIGHT COMPANY, INC., Glenside, PA (US)

(72) Inventors: Curtis Cole, Glenside, PA (US); Jay Silverman, Glenside, PA (US)

(73) Assignee: Solar Light Company, Inc., Glenside, PA (US)

( * ) Notice: Subject to any disclaimer, the term of this patent is extended or adjusted under 35 U.S.C. 154(b) by 0 days.

(21) Appl. No.: 16/736,216

(22) Filed: Jan. 7, 2020

(65) Prior Publication Data

US 2020/0141863 A1 May 7, 2020

Related U.S. Application Data

(63) Continuation of application No. PCT/US2019/031091, filed on May 7, 2019.

(60) Provisional application No. 62/668,289, filed on May 8, 2018.

(51) Int. Cl.
| | |
|---|---|
| *G01N 21/33* | (2006.01) |
| *G01N 21/01* | (2006.01) |
| *A61Q 17/04* | (2006.01) |
| *A61Q 19/00* | (2006.01) |

(52) U.S. Cl.
CPC .............. *G01N 21/33* (2013.01); *A61Q 17/04* (2013.01); *A61Q 19/00* (2013.01); *G01N 21/01* (2013.01)

(58) Field of Classification Search
CPC ........ G01N 21/33; G01N 21/01; A61Q 17/04; A61Q 19/00
See application file for complete search history.

(56) References Cited

U.S. PATENT DOCUMENTS

| | | | | |
|---|---|---|---|---|
| 5,640,957 | A * | 6/1997 | Kaminski | A61B 5/445 600/407 |
| 6,130,435 | A * | 10/2000 | Rocklin | G01J 1/50 250/474.1 |
| 7,172,754 | B1 * | 2/2007 | Rosevear | A61K 8/06 424/400 |
| 8,159,656 | B2 | 4/2012 | Miura et al. | |
| 9,063,054 | B2 | 6/2015 | Stanfield et al. | |
| 2002/0167669 | A1 | 11/2002 | Schwarz | |
| 2006/0134026 | A1 * | 6/2006 | Park | A61K 8/29 424/59 |

(Continued)

FOREIGN PATENT DOCUMENTS

WO    2018217432 A1    11/2018

OTHER PUBLICATIONS

French, National Toxicology Program Report 21, Nih Publication No. 92/3344, Oct. 1992, Pgs. 1 & 7 (Year: 1992).*

(Continued)

*Primary Examiner* — David P Porta
*Assistant Examiner* — Jeremy S Valentiner
(74) *Attorney, Agent, or Firm* — Mark T. Vogelbacker; Eckert Seamans Cherln & Mellott, LLC (57) ABSTRACT

An all-purpose device capable of in vitro spectral analysis of sunscreen compositions as well as diffuse reflectance spectroscopy (DRS) capabilities on human skin includes a fiber optic guide, a light source positioned at one end of the fiber optic guide, and a sunscreen substrate assembly positioned at another end of the fiber optic guide.

16 Claims, 7 Drawing Sheets

(56) References Cited

U.S. PATENT DOCUMENTS

| | | | |
|---|---|---|---|
| 2014/0063504 A1* | 3/2014 | Stanfield | G01N 21/33 356/440 |
| 2016/0025481 A1* | 1/2016 | Stanfield | G01B 11/0633 356/632 |
| 2017/0027828 A1* | 2/2017 | Lee | D06M 13/127 |

OTHER PUBLICATIONS

International Search Report for International Application No. PCT/US2019/031091, dated Aug. 30, 2019.
Gillies, et al., Non-Invasive in Vivo Determination of UVA Efficacy of Sunscreens Using Diffuse Reflectance Spectroscopy, Photodermatology, Photoimmunology & Photomedicine, vol. 19, No. 4, pp. 190-194, Aug. 4, 2003.
Milosevic, et al., "A Review of FT-IR Diffuse Reflection Sampling Considerations", Applied Spectroscopy Reviews, vol. 37, No. 4, pp. 347-364, 2002.
Morabito, et al., "Review of Sunscreen and the Emergence of Non-Conventional Absorbers and Their Applications in Ultraviolet Protection", International Journal of Cosmetic Science, vol. 33, No. 5, pp. 385-390, Apr. 21, 2011.
Lott, et al., "Uniformity of Sunscreen Product Application: A Problem in Testing, a Problem for Consumers", Photodermatology, Photoimmunology & Photomedicine, vol. 19, No. 1, pp. 17-20, Mar. 12, 2003.
Labsphere, "UV-2000S", Labsphere, Published Apr. 11, 2017, Acquired from web Dec. 31, 2019, <www.labsphere.com/labsphere-products-solutions/components-accessories/spf-upf-testers/uv-2000s/>.
Ruvolo, et al., "New Non-Invasive Approach Assessing in Vivo Sun Protection Factor (SPF) Using Diffuse Reflectance Spectroscopy (DRS) and in Vitro Transmission Photoderm", Photodermatology, Photoimmunology & Photomedicine, vol. 30, No. 4, 10 pages, Dec. 22, 2014.
Rohr, et al., "Hybrid Diffuse Reflectance Spectroscopy: Non-Erythemal in Vivo Testing of Sun Protection Factor", Skin Pharmacological Physiology, vol. 31, pp. 220-228, May 23, 2018.

* cited by examiner

IN VITRO DIFFUSE REFLECTANCE SPECTROSCOPY

CROSS-REFERENCE TO RELATED APPLICATION

This application is a continuation of International Application No. PCT/US2019/031091, filed May 7, 2019 and titled "IN VITRO DIFFUSE REFLECTANCE SPECTROSCOPY," which claims priority to U.S. Provisional Patent Application No. 62/668,289, filed May 8, 2018, and entitled "IN VITRO DRS," the entire disclosures of which are herein incorporated by reference in their entirety.

FIELD

In one embodiment, the presently disclosed technology relates to developing an all-purpose device capable of in vitro spectral analysis of sunscreen compositions as well as diffuse reflectance spectroscopy (DRS) capabilities on human skin. As used herein, the terms "sunscreen" and "sunscreen composition" refer to a substance that includes active ingredients as well as inactive ingredients, vehicles and/or carriers, and is suitable for application to the skin. A "sunscreen active ingredient" is a chemical entity that is an active ingredient in a sunscreen composition and has the ability to protect skin from the harmful effect of light.

BACKGROUND AND DESCRIPTION OF RELATED ART

Measurement of sunscreen efficacy against sunburn is determined by human SPF testing, wherein the skin is irradiated with solar simulated ultraviolet radiation (UV) (290-400 nm) with the sunscreen composition applied to the skin's surface, and in a second location without the sunscreen composition on the skin. The ratio of the UV doses required to cause erythema (sunburn) with the sunscreen divided the dose without a sunscreen is the Sun Protection Factor, commonly known as the SPF of a sunscreen. Scientists have struggled for over 50 years to come up with an in vitro test method to be able to eliminate the clinical SPF testing on humans. Currently, the most promising testing method is the hybrid diffuse spectroscopy (HDRS) methodology. See Ruvolo E., Kollias N., Cole C., "New non-invasive approach assessing in vivo Sun Protection Factor (SPF) using Diffuse Reflectance Spectroscopy and in vitro transmission Photoderm," Photoimmun Photomed. 30:4 202-211, 2014, which is incorporated by reference herein. See also Rohr M., Ernst N., Schrader A., "Hybrid Diffuse Reflectance Spectroscopy: Non-erythemal in vivo testing of sunscreen SPF," *Skin Pharmacol. Physiol.* 31:220-228, 2018, which is incorporated by reference herein.

HDRS spectroscopy currently requires two sets of instruments and measurements to generate data to assess sunscreen protection on the skin from 290 to 400 nm. The in vivo Diffuse Reflectance can only measure sunscreen absorbance in the UVA portion of the spectrum on human skin as the proteins, DNA, and melanin in the skin absorb very strongly in the UVB (290-320 nm) range, and insufficient light is remitted back to the receiving optics to fully characterize the sunscreen in this region. So, a second instrument using thin film spectroscopic evaluation of the sunscreen is needed to capture the sunscreen absorbance shape through the entire UVB and UVA spectrum. The HDRS measurement is then used to adjust the magnitude of the in vitro absorbance measurement, as described in the above-cited literature, in order to accurately predict the true SPF value of the protection.

Figure 1:
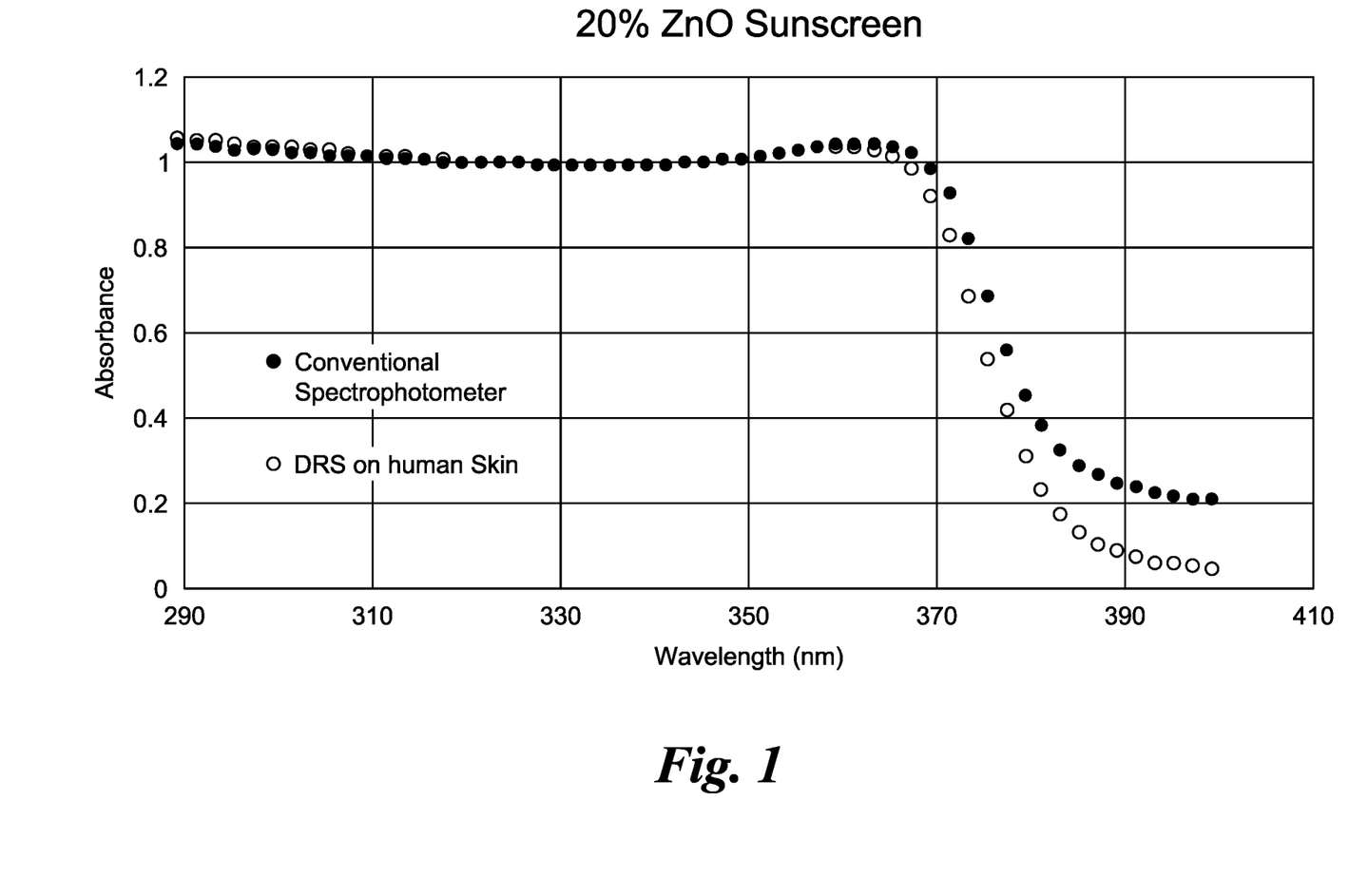
FIG. 1 is a graph charting the absorbance vs. wavelength of 20% zinc oxide sunscreen.

One difficulty encountered using conventional in vitro spectrometers (e.g., those developed or manufactured by LABSPHERE™ of Sutton, N.H. and AGILENT™ of Santa Clara, Calif.) is that they do not accurately record the spectrum of inorganic filters due to loss of low angle scattered light from the sample. This results in an inability to go close to baseline (0) above the absorptive range of the energy band gap phenomena above 370 nm (see FIG. 1). These two measurements (conventional spectrophotometric transmission measurement and DRS measurement) yield different critical wavelength values (wavelength below which 90% of the absorbance area under the curve (AUC) exist), and also different UVA-protection factors (UVA-PF).

The in vivo DRS spectrum on human skin is the correct spectrum as it is obtained directly on human skin, and the optics has capabilities to capture remitted off-angle scattered light missing from the conventional spectrophotometric measurements resulting in false absorbance values.

BRIEF SUMMARY

There is a need or desire to create one device capable of completing both parts of the above-described prior art test, which would eliminate unnecessary instrumentation and complexity, and reduce expense. This and other needs are addressed by the presently disclosed technology.

Combining these techniques (e.g., full scan spectroscopic measurement 290-400 nm, using a thin artificial substrate and reflective surface, and measuring the diffuse reflectance using the same instrumentation on human skin), it is possible to predict the in vivo SPF and UVA-PF measures without having to irradiate human subjects with harmful UV (with the exception of the very small UVA exposure necessary for the human DRS measurements).

In one aspect, the presently disclosed technology is directed to a method of in vitro measurement of the protection of a sunscreen composition. The method includes applying the sunscreen composition to a sunscreen substrate. The sunscreen substrate is positioned on top of at least one of i) a reflective surface or ii) a layer of gelatin or other media container scattering or reflective elements therein. The method includes directing a light source at the sunscreen composition on the sunscreen substrate. The method includes measuring the amount of light remitted from the sunscreen.

In another aspect, the presently disclosed technology is directed to system of in vitro measurement of the protection of a sunscreen composition. The system includes a fiber optic guide and a light emission and sensing device positioned at one end of the fiber optic guide. The system includes a sunscreen substrate assembly positioned at another end of the fiber optic guide. The sunscreen substrate assembly includes a layer of sunscreen composition applied to a sunscreen substrate. The sunscreen substrate is positioned on top of at least one of i) a reflective surface or ii) a layer of gelatin or other media container scattering or reflective elements therein. At least some light emitted from the light emission and sensing device is remitted off of the sunscreen substrate assembly and measured by a photosensor of the light emission and sensing device.

In still another aspect, the presently disclosed technology is directed to a system of in vitro measurement of the protection of a sunscreen composition. The system includes a fiber optic guide and a light emission and sensing device positioned at one end of the fiber optic guide. The system includes a sunscreen substrate assembly positioned at another end of the fiber optic guide. The sunscreen substrate assembly includes a layer of sunscreen composition applied to a sunscreen substrate. The sunscreen substrate includes a plurality of reflecting particles embedded therein. At least some light emitted from the light emission and sensing device is remitted off of the sunscreen substrate assembly and measured by a photosensor of the light emission and sensing device.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

In Vivo Mode

In one optional embodiment, the presently disclosed technology includes a light source 12, which can be configured to emit light over the range from 290 to 400 nm, and optionally up to 600 nm for the measurement of sunscreens. This range can be adjusted to include longer wavelengths through the visible and infrared range for other applications in skin spectroscopy for measurement of applications of ingredients or emollients on the skin surface, or for skin moisturization for example.

Figure 2:
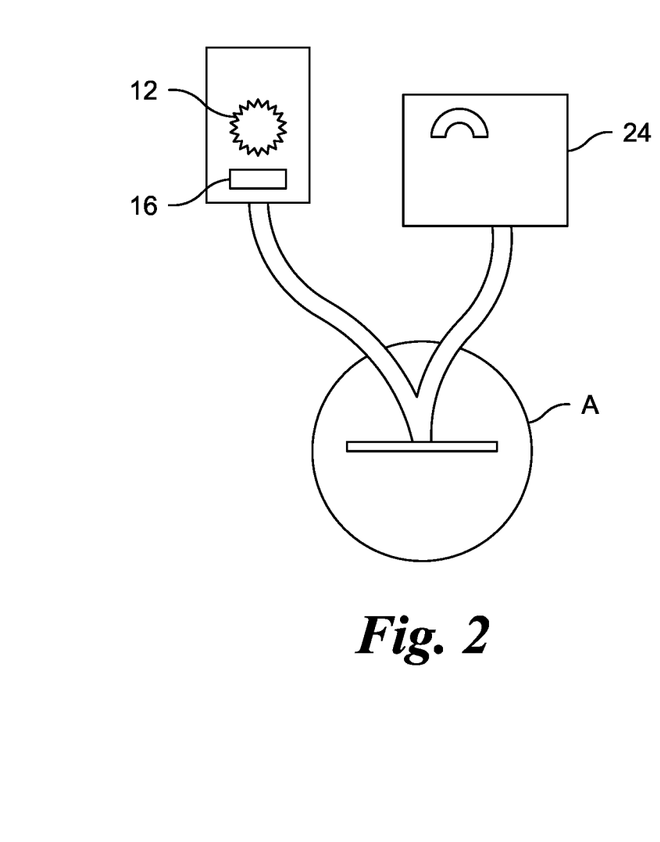
FIG. 2 is a schematic representation of one optional embodiment of the presently disclosed technology, wherein in vivo DRS mode is employed on human skin or skin substrate.

FIG. 2 shows the light source 12 as being an optional xenon arc lamp, which can be operated in either flash mode or as a continuous source. In one optional embodiment shown in FIGS. 3 and 3A, light from the lamp 12 is reflected off of a sunscreen substrate assembly 18 (sometimes referred to herein as the "test substrate assembly"), which can optionally include a reflecting surface 14, such as but not limited to a dichroic "cold" UV reflecting mirror, to diminish the visible and IR portions of the spectrum. This provides full UVA output over the range of approximately 320 to 420 nm (although longer wavelengths can also be included).

In any embodiment, the light source 12 can incorporate or include an optional filter 16 (see FIG. 2), such as but not limited to a UVB blocking filter to eliminate harmful sunburning radiation from exposure to the skin. Optionally, the filter 16 can be a SCHOTT™ (Duryea, Pa.) WG335 filter having a thickness of 3 mm in thickness. Prior art examples of DRS or HDRS measurements of sunscreens on human skin utilize monochromators before and after the light source used to illuminate the skin, and the monochromators are synched to the same wavelength. See, e.g., Gilles R., Moyal D., Forestier S, Kollias N., "Non-invasive in vivo determination of UVA efficacy of sunscreens using diffuse reflectance spectroscopy," Photoderm. PhotoImmunol. Photomed, 19:4, 190-194, 2003, which is incorporated by reference herein. Broad spectrum polychromatic light is used in the example shown in FIGS. 2 and 2A.

Figure 2A:
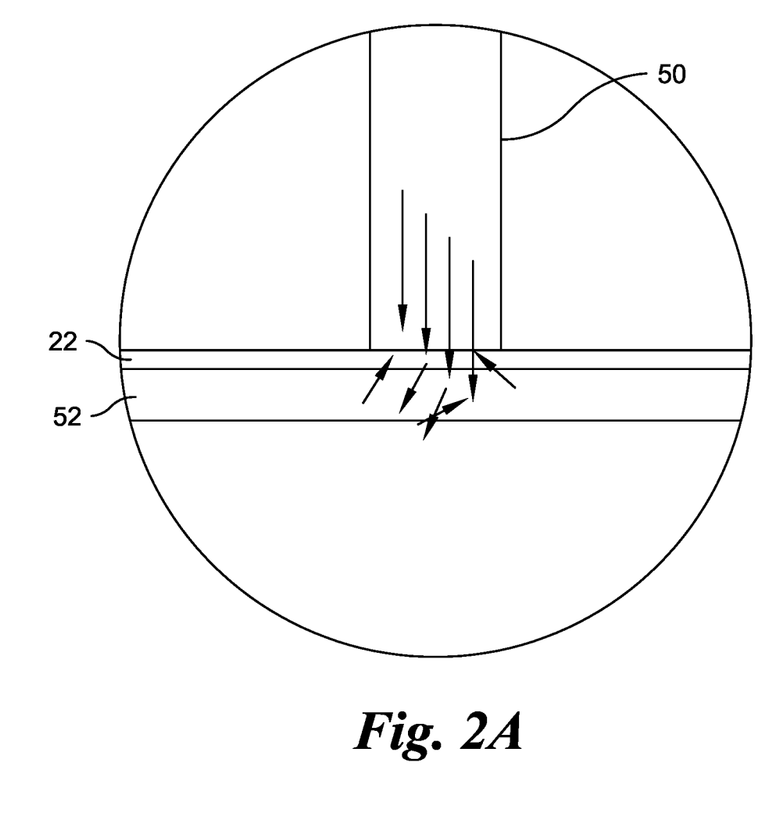
FIG. 2A is a magnified view of area A of FIG. 2.

The presently disclosed technology can employ a fiber optic light guide(s) and a diffuse reflectance head that is the same as that described in International Publication No. WO 2018/217432, which is hereby incorporated by reference in its entirety. Optionally, linear optical output is separated from the linear optical reading slivers by approximately 40 μm. As shown in FIGS. 2 and 2A, the light leaving the optical head 50 is measured first on unprotected skin 52 (e.g., can be human skin or excised skin from surgical remnants, cadavers, or chicken skin, or pig skin excised post-slaughter, or the like) to determine the baseline skin remission as a function of wavelength from 320 to 400 nm. Sunscreen composition 22 is then applied to the surface of the human skin 52 or a skin substrate (such as animal skin) at the desired density, typically 2 mg/cm$^2$ and allowed to dry and then the remission through the skin is measured again at each wavelength sequentially (e.g., scanning monochromator) or simultaneously (e.g., CCC spectrometer).

The transmission through the sunscreen is calculated at each wavelength as:

$$T_\lambda = \sqrt{\frac{It_\lambda}{I_{0\lambda}}} \qquad \text{Eq. 1}$$

$$A_\lambda = -\log(T_\lambda) \qquad \text{Eq. 2}$$

Absorbance spectra are calculated as the negative log of the transmission values. This absorbance spectrum is used to adjust the in vitro absorbance measurements determined separately to an absolute absorbance range.

Full Spectrum In Vitro Absorbance Scanning

In conventional in vitro testing, the full spectrum absorbance scan of the sunscreen is done by applying sunscreen to a UV transmissive substrate (such as a roughened quartz plate, or PMMA plastic plate) and the treated plate is placed into a light beam within a spectro photometer such as a LABSPHERE™ or VARIAN CARY™ and the light emerging through the treated plate is measured (no mirror or reflective substrate is placed behind the transmissive substrate), and the absorbance is calculated by comparison of the light intensity without the sunscreen on the plate, and the light intensity with the sunscreen on the plate where:

$$A_\lambda = -\log\left(\frac{I_{t\lambda}}{I_{0\lambda}}\right) \qquad \text{Eq. 3}$$

Where $A_\lambda$ is the absorbance of the sunscreen at each wavelength, $I_{t\lambda}$ is the intensity of the transmitted light through the sunscreen at each wavelength and $I_{0\lambda}$ is the intensity of the transmitted light at each wavelength without the sunscreen on the plate at each wavelength.

Figure 3:
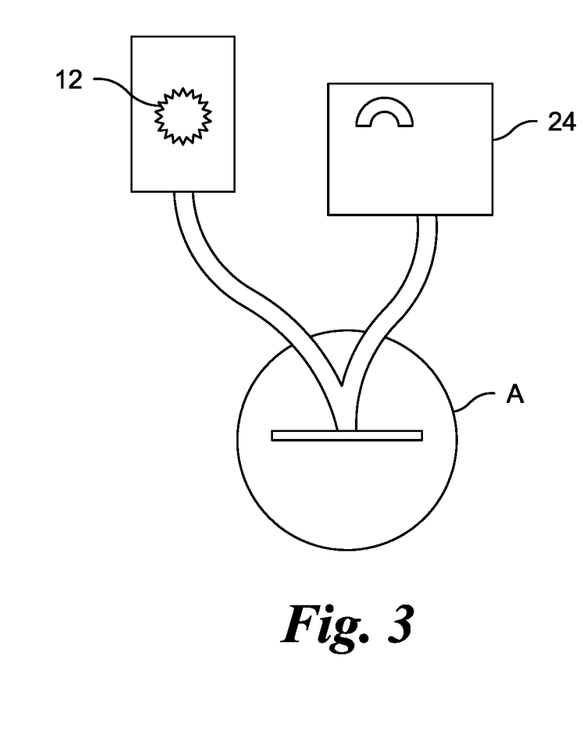
FIG. 3 is a schematic representation of one optional embodiment of the presently disclosed technology, wherein in vitro DRS mode is employed on a first test substrate.
Figure 3A:
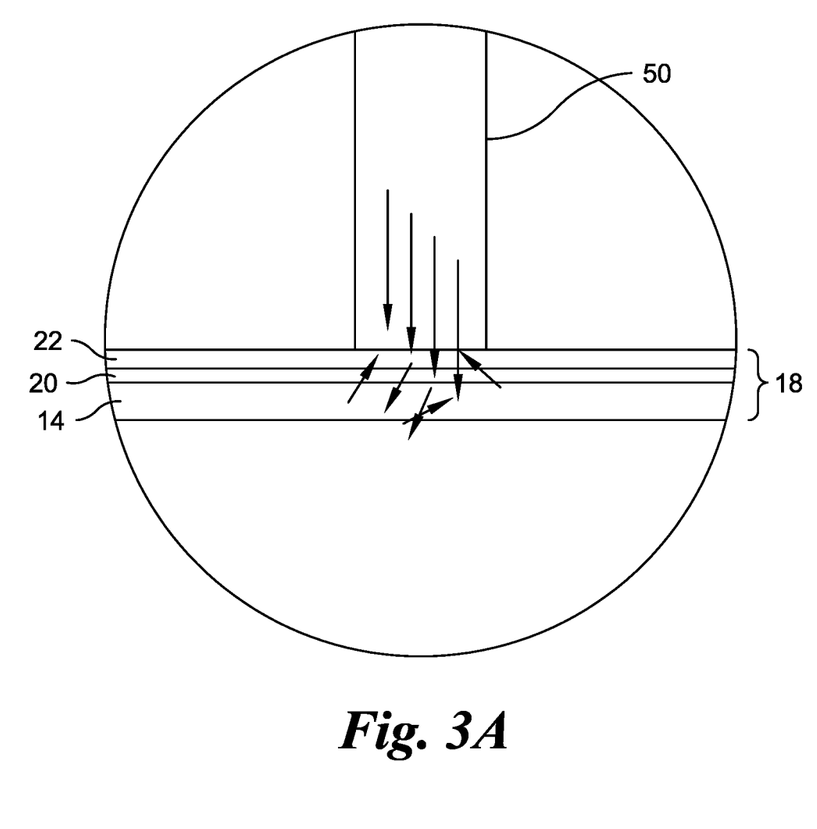
FIG. 3A is a magnified view of area A of FIG. 3.
Figure 4:
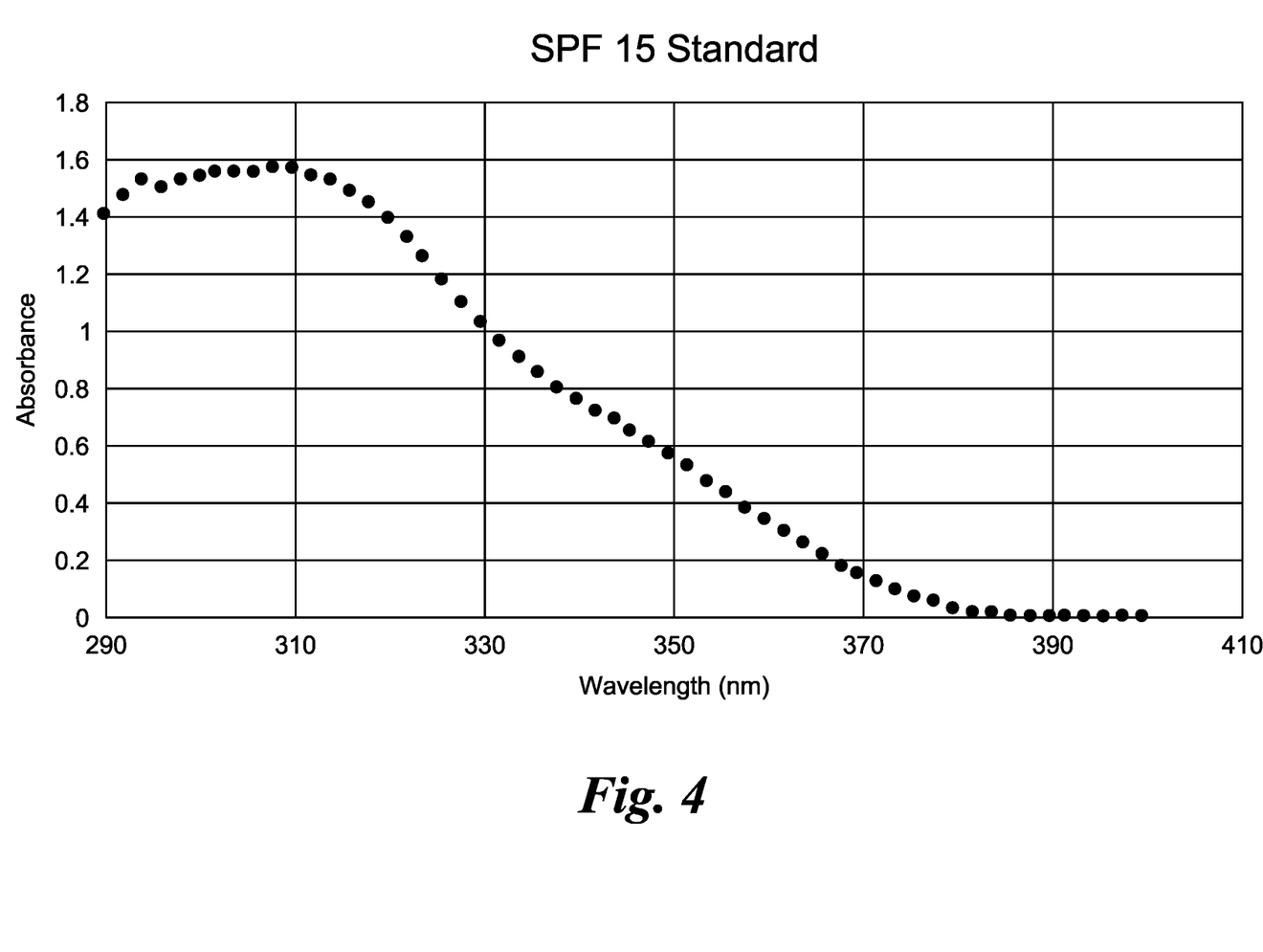
FIG. 4 is a graph charting the absorbance vs. wavelength of SPF 15 sunscreen.

Referring to FIGS. 3 and 3A, in one embodiment, the design for the presently disclosed technology for the in vitro absorbance measurement can include the light source 12 (e.g., a lamp in flash mode or continuous), with the dichroic "cold" UV reflecting mirror 14, but without optical filtration (UG11 or WG335 filtration) for use on or in the in vitro test substrate assembly 18. The light from the lamp 12 would be delivered through the same bifurcated fiber optic bundle and optic head used for the DRS measurements on skin, as discussed above.

Referring again to FIG. 3A, the sunscreen substrate assembly 18 can optionally include a sunscreen substrate 20. The sunscreen substrate 20 can be a plastic plate, such as but not limited to PMMA or acrylic, with a roughened surface for scattering, or a molded PMMA plate, with scattering non-absorbing media such as air bubbles, or plastic beads with no absorptive properties. The sunscreen substrate assembly 18 can also optionally include the reflective surface 14, such as a mirror or other reflecting material, on the bottom of the sunscreen substrate 20 to reflect the light back through the sunscreen substrate 20 and the sunscreen composition 22 on the top surface of the sunscreen substrate 20, to be captured by the receiving fiber optic 50, and received at or imaged into a photosensor or light sensing device 24, such as a dispersing monochromator with a CCD detector system for instantaneous or sequential scanning of the spectral intensity at each wavelength or a CCD spectrometer. The sunscreen substrate assembly 18 can be used with sunscreens containing organic (dissolved) ultraviolet filters.

The absorbance is calculated by Eq. 1 and Eq. 2 shown above, wherein $T_\lambda$=the transmission of the light through the sunscreen at each wavelength, $I_{t\lambda}$ is the intensity of the light transmitted twice through the sunscreen and the plate at each wavelength, $I_{0\lambda}$ is the intensity of the light transmitted twice through the plate (no sunscreen) at each wavelength, and the absorbance at each wavelength $A_\lambda$ is simply the $-\log$ of $T_\lambda$.

Figure 5:
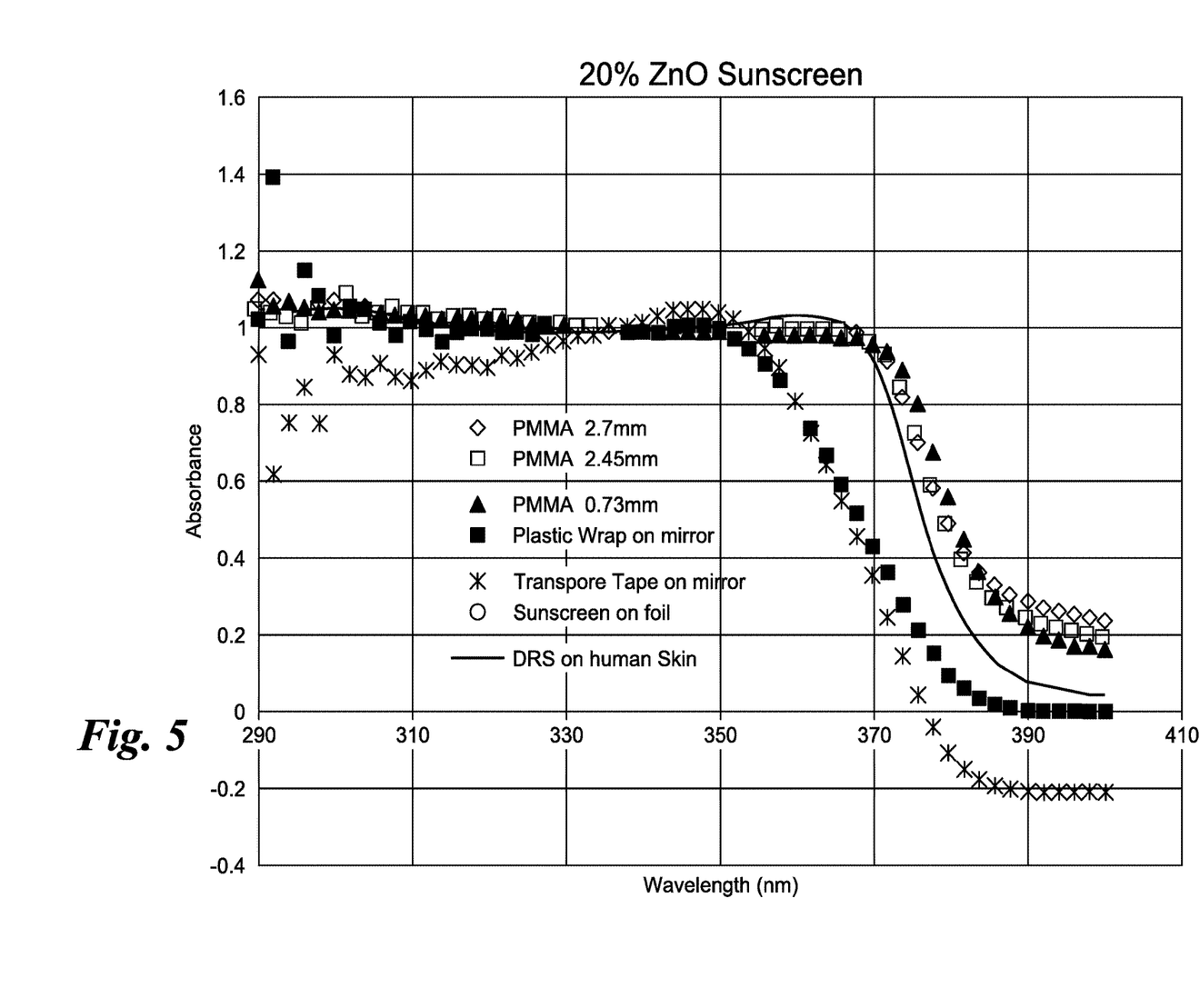
FIG. 5 is a graph charting the absorbance vs. wavelength for 20% zinc oxide containing inorganic sunscreen on plates of different thicknesses/distances from the reflective surface.

For measurements of sunscreens containing inorganic sunscreen active ingredients, such as zinc oxide or titanium dioxide, measurements with the sunscreen substrate assembly 18 have shown that the thickness of the substrate is important to capturing the off angle reflected and remitted light from inorganic sunscreen active ingredients such as ZnO (see FIG. 5). Thus, the sunscreen substrate should be equal or less than 0.73 mm from the application surface to the front of the reflective surface to mimic the human skin use situation and have absorbance approaching zero near 400 nm. Many sunscreen substrates may be used for this purpose, such as but not limited to thin plastic food wrap, TRANSPORE™ tape (manufactured by 3M™ of St. Paul, Minn.), nylon film, lamb-skin condoms, VITRO SKIN™ (manufactured by IMS-Inc.™ of Portland, Me.) having sufficient UV transmission in the UVB (290-320 nm) range to transmit the reflected light after passing through the sunscreen composition.

However, simply applying the sunscreen composition to such a substrate over the reflective surface does not give accurate results compared with the in vivo human skin DRS measurement (solid line) shown in FIG. 5. The sunscreen substrate assembly 18 shown in FIG. 3A yielded a skewed absorbance profile as well as inappropriate "reflection" (negative absorbance) at wavelengths above 370 nm for the plastic wrap. So there is a critical distance needed for mixing and diffusion of the light for appropriately shaped spectral absorbance measurements of sunscreens containing inorganic sunscreen active ingredients.

Figure 6:
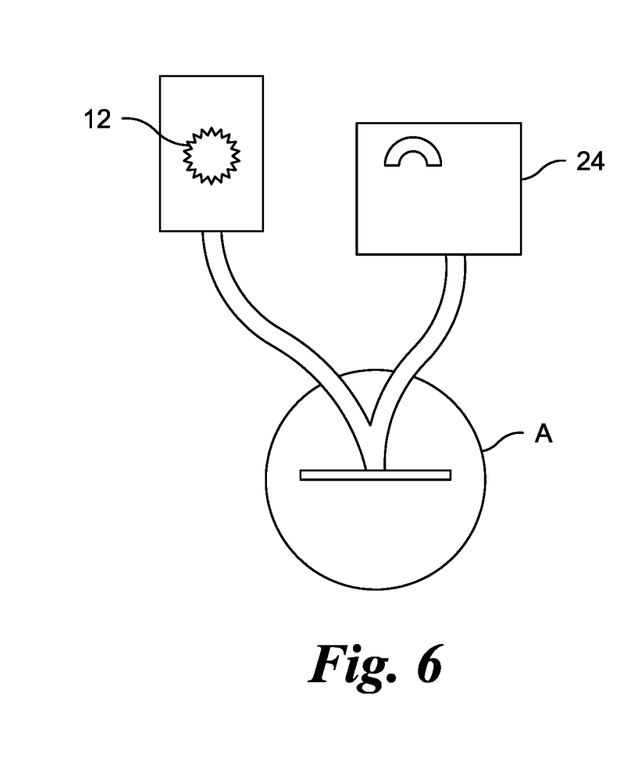
FIG. 6 is a schematic representation of one optional embodiment of the presently disclosed technology, wherein in vitro DRS mode is employed on a second test substrate.
Figure 6A:
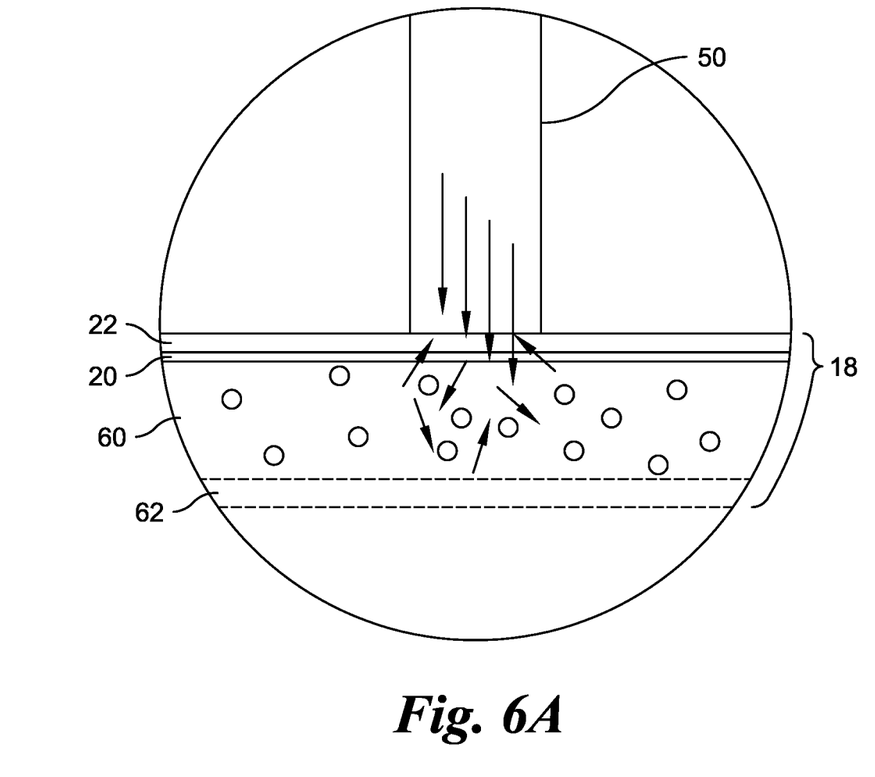
FIG. 6A is a magnified view of area A of FIG. 6.
Figure 7:
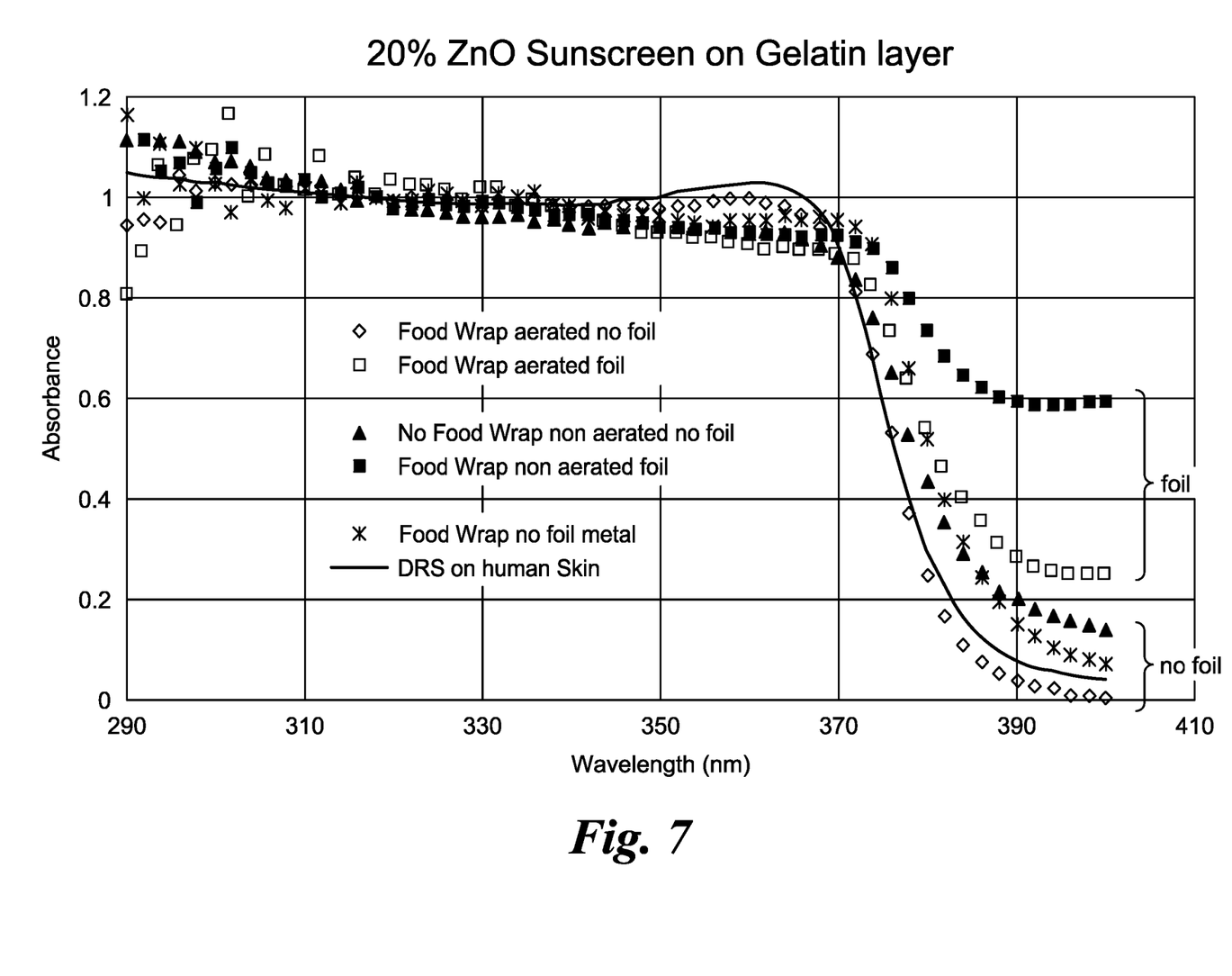
FIG. 7 is a graph charting the absorbance vs. wavelength for 20% zinc oxide containing sunscreen on a gelatin layer.

To address the above-described drawback, an approach to more closely mimic the skin's surface and content, other substrate assemblies were tested (see FIGS. 6 and 6A). HELIOSCIENCE™ (manufactured by Helioscience of Marsielles, FR) PMMA plates 20 were inverted, and the well created was filled with KNOX™ gelatin 60 (e.g., collagen) to a thickness of approximately 1.25 mm or a similar media with scattering reflective elements. Sets of inverted HELIOSCIENCE™ PMMA plates were prepared with aerated gelatin mixture, and one set was prepared with un-aerated gelatin and allowed to set overnight. One example of gelatin containing aluminum metal filings for reflection and scattering was also prepared. The aerated sample provides air bubbles to further scatter and mix the light that has passed through the sunscreen composition. Some samples were prepared with a sheet of food grade aluminum foil 62 at the bottom of the well with the gelatin placed over the surface of the foil. Measurements were made on plastic food wrap over the gelatin surface. Some measurements were also done with sunscreen application directly to the surface of the gelatin (without the sunscreen substrate as depicted in FIG. 6A). The data is shown in FIG. 7.

Calculations for absorbance spectra would be made using measurements with, and without the sunscreen in place. The negative log of the square root of the ratio of intensity with the sunscreen divided by the intensity without the sunscreen provides the absorbance values at each wavelength, as shown in Eqs. 1 and 2.

The data showed the closest approximation to the human DRS absorbance curve was seen with aerated gelatin and non-aerated gelatin with the metal filings but without the aluminum foil reflector sheet in the bottom for both. Non-aerated gelatin was also similar to the human in vivo absorbance curve when used without the aluminum foil sheet at the bottom. The addition of the foil to the bottom of the well covered with the gelatin had a very distorting effect to the absorbance measurements and should not be used. Application of sunscreen directly to the surface of the gelatin gave a good measurement, however the fragility of the gelatin surface was not optimal and made spreading difficult. A more firm or rigid media would allow direct application to the surface.

The optimal device for measurement of the diffuse reflectance of a sunscreen uses a thin (less than 0.73 mm) substrate to which the sunscreen is applied, such as but not limited to plastic food wrap (SARAN™ Wrap), TRANSPORE™ Tape, nylon film, lambskin condoms, VITRO SKIN™ and similar thin UVB transmissive substrates. The substrate is then on top of a scattering/diffusing medium, such as but not limited to a gelatin media or similar diffusing gels or materials, which may contain trapped air bubbles, air filled beads, or scattering and reflecting materials such as small metal particles or beads. In one embodiment, a smooth reflective surface should not be placed below the gelatin layer.

SPF Determination Vis DRS Hybrid Technique

For determination of SPF of the sunscreen, the Hybrid DRS methodology can be employed as shown in prior publications, as discussed above. The UVA absorbance spectrum of the sunscreen is determined using the DRS scan of the absorbance of the UVA wavelengths in in vivo mode. The full spectrum from 290 to 400 mm is determined with the scan from the in vitro mode, as described above. The in vitro absorbance scan is adjusted to match the absorbance values of the in vivo absorbance scan by equating the absorbance in the range 330-350 nm and attaching the UVB portion of the in vitro scan to the in vivo absorbance scan to have a completed 290-400 mm absolute range of absorbance. From this absorbance curve SPF, UVA-PF, Critical Wavelength, and other UV ratios can be calculated for sunscreen protection determinations.

The presently disclosed technology thus allows two functions required for Hybrid SPF testing to be combined into one device using the same optical elements. As a result, full spectral absorption analysis can be performed on the in vitro substrate, and provides a partial (UVA) absorbance spectrum on human (or skin substitute) that can be used to scale the in vitro absorbance curve. Thus, the user is only required to purchase, learn, and operate just one piece of equipment.

Use of an optimized sunscreen substrate assembly comprised of a thin sunscreen substrate over a layer of diffuse reflecting and scattering media, which may or may not contain internal reflecting beads, bubbles, or particles, provides absorbance spectra superior to other optical arrangements.

In an optional embodiment, the sunscreen substrate assembly can include a layer of sunscreen composition on top of a sunscreen substrate in the form of a plate embedded with a plurality of reflective particles. In such an embodiment, a reflective surface or mirror, or a gelatin layer or other media with scattering or reflective elements, is omitted or not necessary beneath the plate.

The following exemplary embodiments further describe optional aspects of the presently disclosed technology and are part of this Detailed Description. These exemplary embodiments are set forth in a format substantially akin to claims (each with numerical designations followed by the letter A), although they are not technically claims of the present application. The following exemplary embodiments refer to each other in dependent relationships as "embodiments" instead of "claims."

1A. A method of in vitro measurement of the protection of a sunscreen composition, the method comprising:
applying sunscreen to a sunscreen substrate, the sunscreen substrate being positioned on top of one of i) a reflective surface or ii) a layer of gelatin or iii) other media containing scattering or reflective elements therein;
directing a light source at the sunscreen on the sunscreen substrate assembly; and
measuring the amount of light remitted from the sunscreen.

2A. The method of embodiment 1A, wherein the sunscreen is an inorganic sunscreen and wherein the layer of gelatin or the other media containing scattering or reflective elements is employed.

1B. A method of in vitro measurement of the protection of a sunscreen composition, the method comprising:
applying sunscreen to a sunscreen substrate, the sunscreen substrate being a plate having reflective elements therein;
directing a light source at the sunscreen on the sunscreen substrate; and
measuring the amount of light remitted from the sunscreen.

2B. The method of embodiment 1B, wherein no layer is located beneath the plate.

1C. A method of in vitro measurement of the protection of a sunscreen composition, the method comprising:
applying the sunscreen composition to a sunscreen substrate, the sunscreen substrate being positioned on top of at least one of i) a reflective surface or ii) a layer of gelatin or other media container scattering or reflective elements therein;
directing a light source at the sunscreen composition on the sunscreen substrate; and
measuring the amount of light remitted from the sunscreen.

2C. The method of embodiment 1C, wherein the sunscreen composition contains an organic sunscreen active ingredient and wherein the reflective surface is employed.

3C. The method of embodiment 1C, wherein the sunscreen composition contains an inorganic sunscreen active ingredient and wherein the layer of gelatin is employed.

4C. The method of any one of embodiments 1C-3C, wherein the sunscreen substrate is a UVB transmissive substrate.

5C. The method of any one of embodiments 1C-4C, wherein the sunscreen substrate is one of plastic food wrap, nylon film, or lambskin.

6C. The method of any one of embodiments 1C-5C, wherein the sunscreen substrate is placed on top of the layer of gelatin.

7C. The method of embodiment 6C, wherein the layer of gelatin is placed on top of a layer of foil.

8C. The method of any one of embodiments 1C-7C, wherein the sunscreen substrate is placed on top of the reflective surface.

9C. The method of any one of embodiments 1C-8C, wherein at least some of the light from the light source travels through the sunscreen composition, travels through the sunscreen substrate, is remitted off of the reflective surface or the layer of gelatin or the other media container scattering or reflective elements therein, travels back through the sunscreen substrate, travels back through the sunscreen composition, travels into an optical head of a fiber optic guide, and travels to a photosensor.

1D. A system of in vitro measurement of the protection of a sunscreen composition, the system comprising:
a fiber optic guide;
a light emission and sensing device positioned at one end of the fiber optic guide; and
a sunscreen substrate assembly positioned at another end of the fiber optic guide, the sunscreen substrate assembly including a layer of sunscreen composition applied to a sunscreen substrate, the sunscreen substrate being positioned on top of at least one of i) a reflective surface or ii) a layer of gelatin or other media container scattering or reflective elements therein, wherein at least some light emitted from the light emission and sensing device is remitted off of the sunscreen substrate assembly and measured by a photosensor of the light emission and sensing device.

2D. The system of embodiment 1D, wherein the light emission and sensing device includes a xenon flash lamp.

3D. The system of any one of embodiments 1D or 2D, wherein the sunscreen substrate to which the layer of sunscreen composition is applied has a thickness of less than 0.73 mm.

4D. The system of any one of embodiments 1D-3D, wherein the fiber optic guide includes an emitted light conduit for conducting light from the light source to the sunscreen and a remitted light conduit for conducting light remitted from the sunscreen to the photosensor.

5D. The system of any one of embodiments 1D-4D, wherein the sunscreen composition contains an organic sunscreen and wherein the reflective surface is employed.

6D. The system of any one of embodiments 1D-5D, wherein the sunscreen contains an inorganic sunscreen active ingredient and wherein the layer of gelatin or other media container scattering or reflective elements therein is employed.

7D. The system of any one of embodiments 1D-6D, wherein the sunscreen substrate is a UVB transmissive substrate.

8D. The system of any one of embodiments 1D-7D, wherein the sunscreen substrate is one of plastic food wrap, nylon film, or lambskin.

9D. The system of any one of embodiments 1D-8D, wherein the sunscreen substrate is placed on top of the layer of gelatin.

10D. The system of embodiment 9D, wherein the layer of gelatin is placed on top of a layer of foil.

11D. The system of any one of embodiments 1D-10D, wherein the sunscreen substrate is placed on top of the reflective surface.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the present presently disclosed technology as defined by the appended claims.

What is claimed is:

1. A method of in vitro measurement of the protection of a sunscreen composition, the method comprising:
    applying the sunscreen composition to a sunscreen substrate, the sunscreen substrate being positioned on top of at least a layer of gelatin or other media containing scattering elements therein, the layer of gelatin being placed on top of a layer of foil;
    directing a light source at the sunscreen composition on the sunscreen substrate; and
    measuring the amount of light remitted from the sunscreen.

2. The method of claim 1, wherein the sunscreen composition contains an organic sunscreen active ingredient.

3. The method of claim 1, wherein the sunscreen composition contains an inorganic sunscreen active ingredient.

4. The method of claim 1, wherein the sunscreen substrate is a UVB transmissive substrate.

5. The method of claim 1, wherein the sunscreen substrate is one of plastic food wrap, nylon film, or lambskin.

6. The method of claim 1, wherein at least some of the light from the light source travels through the sunscreen composition, travels through the sunscreen substrate, is remitted off of the layer of gelatin or the other media containing scattering elements therein, travels back through the sunscreen substrate, travels back through the sunscreen composition, travels into an optical head of a fiber optic guide, and travels to a photosensor.

7. The method of claim 1, wherein the sunscreen substrate is a UVA and a UVB transmissive substrate.

8. A system of in vitro measurement of the protection of a sunscreen composition, the system comprising:
    a fiber optic guide;
    a light emission and sensing device positioned at one end of the fiber optic guide; and
    a sunscreen substrate assembly positioned at another end of the fiber optic guide, the sunscreen substrate assembly including a layer of sunscreen composition applied to a sunscreen substrate, the sunscreen substrate being positioned on top of at least a layer of gelatin or other media containing scattering elements therein, the layer of gelatin being placed on top of a layer of foil,
    wherein at least some light emitted from the light emission and sensing device is remitted off of the sunscreen substrate assembly and measured by a photosensor of the light emission and sensing device.

9. The system of claim 8, wherein the light emission and sensing device includes a xenon flash lamp.

10. The system of claim 8, wherein the sunscreen substrate to which the layer of sunscreen composition is applied has a thickness of less than 0.73 mm.

11. The system of claim 8, wherein the fiber optic guide includes an emitted light conduit for conducting light from the light source to the sunscreen and a remitted light conduit for conducting light remitted from the sunscreen to the photosensor.

12. The system of claim 8, wherein the sunscreen composition contains an organic.

13. The system of claim 8, wherein the sunscreen contains an inorganic sunscreen active ingredient.

14. The system of claim 8, wherein the sunscreen substrate is a UVB transmissive substrate.

15. The system of claim 8, wherein the sunscreen substrate is one of plastic food wrap, nylon film, or lambskin.

16. The system of claim 8, wherein the sunscreen substrate is a UVA and a UVB transmissive substrate.

* * * * *